(12) United States Patent
Yun et al.

(10) Patent No.: US 12,294,084 B2
(45) Date of Patent: May 6, 2025

(54) POSITIVE ACTIVE MATERIAL FOR RECHARGEABLE LITHIUM BATTERY, PREPARING METHOD THEREOF AND RECHARGEABLE LITHIUM BATTERY INCLUDING THE SAME

(71) Applicant: Samsung SDI Co., Ltd., Yongin-si (KR)

(72) Inventors: Pilsang Yun, Yongin-si (KR); Hyunbeom Kim, Yongin-si (KR); Sangin Park, Yongin-si (KR); Yongchan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 82 days.

(21) Appl. No.: 17/454,209

(22) Filed: Nov. 9, 2021

(65) Prior Publication Data
US 2022/0255072 A1 Aug. 11, 2022

(30) Foreign Application Priority Data

Jan. 29, 2021 (KR) .................. 10-2021-0013499

(51) Int. Cl.
*H01M 4/525* (2010.01)
*H01M 4/04* (2006.01)
*H01M 4/505* (2010.01)
*H01M 10/0525* (2010.01)
*H01M 4/02* (2006.01)

(52) U.S. Cl.
CPC ......... *H01M 4/525* (2013.01); *H01M 4/0471* (2013.01); *H01M 4/505* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 9,276,259 B2 | 3/2016 | Chang et al. | |
| 2012/0217435 A1 | 8/2012 | Yamamoto et al. | |
| | (Continued) | | |

FOREIGN PATENT DOCUMENTS

| | | |
|---|---|---|
| CN | 102576869 A | 7/2012 |
| CN | 104835950 A | 8/2015 |
| | (Continued) | |

OTHER PUBLICATIONS

EPO Extended European Search Report dated May 6, 2022, issued in European Patent Application No. 21207251.6, 6 pages.

(Continued)

*Primary Examiner* — Carlos Barcena
(74) *Attorney, Agent, or Firm* — Womble Bond Dickinson (US) LLP (57) ABSTRACT

A positive active material for a rechargeable lithium battery includes a lithium nickel-based metal composite oxide, wherein the positive active material includes secondary particles in which a plurality of primary particles are aggregated, a first boron coating portion present on the outer surfaces of the secondary particles, and a second boron coating portion present on surfaces of the primary particles inside the secondary particles, and a weight of the first boron coating portion is greater than a weight of the second boron coating portion.

18 Claims, 2 Drawing Sheets

(56) References Cited

U.S. PATENT DOCUMENTS

| | | |
|---|---|---|
| 2015/0228969 A1 | 8/2015 | Cho et al. |
| 2018/0026268 A1 | 1/2018 | Kim et al. |
| 2018/0212237 A1 | 7/2018 | Lee et al. |
| 2018/0241036 A1 | 8/2018 | Jo et al. |
| 2019/0173076 A1 | 6/2019 | Kim et al. |
| 2019/0393479 A1 | 12/2019 | Kim et al. |
| 2020/0006758 A1 | 1/2020 | Wi et al. |
| 2020/0028168 A1 | 1/2020 | Ju et al. |
| 2020/0127287 A1 | 4/2020 | Yamauchi et al. |
| 2020/0185709 A1 | 6/2020 | Zhou et al. |
| 2020/0185714 A1 | 6/2020 | Han et al. |
| 2020/0313180 A1 | 10/2020 | Ryoshi et al. |
| 2021/0074998 A1 | 3/2021 | Yun et al. |
| 2021/0078868 A1 | 3/2021 | Eom et al. |
| 2023/0111400 A1* | 4/2023 | Lee .................. H01M 10/0525 429/220 |

FOREIGN PATENT DOCUMENTS

| | | | |
|---|---|---|---|
| CN | 107949938 A | | 4/2018 |
| CN | 109997260 A | | 7/2019 |
| CN | 110620216 A | | 12/2019 |
| CN | 111212815 A | | 5/2020 |
| CN | 111226332 A | | 6/2020 |
| EP | 2485305 A1 | | 8/2012 |
| EP | 3514867 A1 | | 7/2019 |
| EP | 3 734 720 A1 | | 11/2020 |
| JP | 2020-102432 A | | 7/2020 |
| KR | 10-2012-0091011 A | | 8/2012 |
| KR | 10-2019-0032248 A | | 3/2019 |
| KR | 10-2019-0065963 A | | 6/2019 |
| KR | 10-2019-0078498 A | | 7/2019 |
| KR | 10-2020-0033354 A | | 3/2020 |
| KR | 10-2020-0041882 A | | 4/2020 |
| KR | 10-2020-0044448 A | | 4/2020 |
| KR | 10-2020-0070649 A | | 6/2020 |
| KR | 10-2020-0090727 A | | 7/2020 |

OTHER PUBLICATIONS

EPO Extended European Search Report dated Jun. 22, 2022, issued in European Patent Application No. 21214895.1, 6 pages.
Chinese Office Action dated Jan. 3, 2024, issued in Chinese Patent Application No. 202111551315.1, 14 pages.
Chinese Office Action dated Jan. 4, 2024, issued in Chinese Patent Application No. 202111318837.7, 13 pages.
EPO European Office Action dated Apr. 8, 2024, issued in European Patent Application No. 21214895.1 (4 pages).
Korean Office Action dated Aug. 29, 2024, issued in corresponding Korean Patent Application No. 10-2021-0013499 (7 pages).
U.S. Office Action dated Nov. 13, 2024, issued in U.S. Appl. No. 17/578,220 (17 pages).
U.S. Final Office action dated Mar. 10, 2025, issued in U.S. Appl. No. 17/578,220, 24 pages.

* cited by examiner

POSITIVE ACTIVE MATERIAL FOR RECHARGEABLE LITHIUM BATTERY, PREPARING METHOD THEREOF AND RECHARGEABLE LITHIUM BATTERY INCLUDING THE SAME

CROSS-REFERENCE TO RELATED APPLICATION

This application claims priority to and the benefit of Korean Patent Application No. 10-2021-0013499 filed in the Korean Intellectual Property Office on Jan. 29, 2021, the entire content of which is incorporated herein by reference.

BACKGROUND

1. Field

One or more aspects of embodiments of the present disclosure relate to a positive active material for a rechargeable lithium battery, a preparing method thereof, and a rechargeable lithium battery including the same.

2. Description of the Related Art

Portable information devices (such as a cell phone, a laptop, smart phone, and/or the like) and electric vehicles have utilized rechargeable lithium batteries having high energy density and easy portability as a driving power source. Recently, research has been actively conducted on rechargeable lithium batteries with high energy density as a driving power source or power storage power source for hybrid or electric vehicles.

Various positive active materials have been investigated to realize rechargeable lithium batteries for various applications. Among them, a nickel-based positive active material having a high capacity is increasing in use. In order to increase battery capacity, research to increase a nickel content (e.g., amount) in the lithium composite metal oxide is being conducted.

However, as the nickel content (e.g., amount) is increased, a cation mixing phenomenon in which $Ni^{2+}$ ions take (e.g., migrate or diffuse to) lithium sites may also increase so that capacity is deteriorated, and/or diffusion of lithium ions may be hindered by impurities (such as NiO and/or the like) so that a battery cycle-life is deteriorated. In addition, there may be a battery safety problem due to a side reaction(s) between the impurities on the surface of the positive active material and an electrolyte. Accordingly, methods of improving capacity characteristics and/or cycle-life characteristics of a battery while increasing the nickel content in the lithium composite metal oxide and securing battery safety is being actively studied.

SUMMARY

One or more aspects of embodiments of the present disclosure are directed toward a positive active material for a rechargeable lithium battery having improved cycle-life characteristics and high capacity, a preparing method thereof, and a rechargeable lithium battery including the same.

One or more embodiments of the present disclosure provide a positive active material for a rechargeable lithium battery including a lithium nickel-based metal composite oxide, wherein the positive active material includes secondary particles in which a plurality of primary particles are aggregated, a first boron coating portion present on an outer surface (e.g., outer surfaces) of the secondary particles, and a second boron coating portion present on surfaces of the primary particles inside the secondary particles, and wherein a weight of the first boron coating portion is greater than a weight of the second boron coating portion.

One or more embodiments of the present disclosure provide a method of preparing a positive active material for a rechargeable lithium battery including mixing a nickel-based metal composite hydroxide, a lithium raw material and a boron raw material, and heat-treating the mixture to obtain the positive active material.

One or more embodiments of the present disclosure provide a rechargeable lithium battery including a positive electrode including the positive active material, a negative electrode, and an electrolyte.

The positive active material for a rechargeable lithium battery manufactured according to an embodiment and a rechargeable lithium battery including the same may exhibit excellent or suitable cycle-life characteristics while realizing a high capacity.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, selected embodiments will be described in more detail so that those of ordinary skill in the art can easily implement them. However, this disclosure may be embodied in many different forms and should not be construed as being limited to the example embodiments set forth herein.

The terminology used herein is used to describe embodiments only, and is not intended to limit the present disclosure. Singular expressions such as "a," "an," and "the" are intended to include plural expressions as well, unless the context clearly dictates otherwise.

As used herein, the term "combination thereof" refers to a mixture, laminate, composite, copolymer, alloy, blend, reaction product, and/or the like of the listed constituents.

Herein, it should be understood that terms such as "comprises," "includes," or "have" are intended to designate the presence of an embodied feature, number, step, element, or a combination thereof, but do not preclude the possibility of the presence or addition of one or more other features, numbers, steps, elements, or combinations thereof.

As used herein, the terms "use," "using," and "used" may be considered synonymous with the terms "utilize," "utilizing," and "utilized," respectively. As used herein, expressions such as "at least one of," "one of," and "selected from," when preceding a list of elements, modify the entire list of elements and do not modify the individual elements of the list. As used herein, the term "and/or" includes any and all combinations of one or more of the associated listed items. Further, the use of "may" when describing embodiments of the present disclosure refers to "one or more embodiments of the present disclosure".

In the drawings, the thickness of layers, films, panels, regions, etc., may be exaggerated for clarity, like reference numerals designate like elements throughout the specification, and duplicative descriptions thereof may not be provided. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The term "layer" includes not only a shape formed on the whole surface when viewed from a plan view, but also a shape formed on a partial surface (e.g., a shape or element occupying only part of the surface of an underlying element).

The average particle diameter may be measured by a method well known to those skilled in the art, and for example, may be measured by a particle size analyzer, or may be measured by a transmission electron micrograph or a scanning electron micrograph. An average particle diameter value may be obtained by measuring a particle sample utilizing a dynamic light scattering method, and analyzing the data by counting the number of particles for each particle size range and calculating a size distribution from this. Unless otherwise defined, the term "average particle diameter" may refer to the diameter (D50) of particles having a cumulative volume of 50 volume % in the particle size distribution.

Positive Active Material

In an embodiment, a positive active material for a rechargeable lithium battery includes a lithium nickel-based metal composite oxide, wherein the positive active material includes secondary particles in which a plurality of primary particles are aggregated (e.g., each secondary particle is formed from an agglomeration of a plurality of primary particles), a first boron coating portion present on surfaces (e.g., outer surfaces) of the secondary particles, and a second boron coating portion present on surfaces of the primary particles inside the secondary particles (e.g., on primary particle surfaces within the interiors of the secondary particles, for example, at interior/internal surfaces along grain boundaries between the primary particles), where a weight of the first boron coating portion is greater than a weight of the second boron coating portion. Such a positive active material may exhibit improved cycle-life characteristics while implementing a high capacity.

The second boron coating portion is present in the internal portion rather than at the outer surface of the secondary particle, and for example may be coated along interfaces between the primary particles inside the secondary particle, and thus may be described as being coated at the grain boundary. Here, the term "internal portion" of the secondary particles refers to the entire interior of each secondary particle except for the area exposed at the outer surface, and for example, may refer to the entire interior from a depth of approximately 2 μm from the outer surface (e.g., the region of the secondary particle that is contained outside a 2 μm thick shell region at the outer surface). It can also be described as the portions or regions of the secondary particles of the positive active material that do not come into contact with effluent when the secondary particles are washed with distilled water.

In the case of coating boron on the positive active material in the art, it is common to utilize a method of heat-treating a boron raw material that is applied by wet or dry mixing after preparing a lithium metal composite oxide. However, in this case, boron acts as (e.g., can contribute to) a resistance on the surface of the positive active material, and may thereby deteriorate capacity and/or cycle-life. In contrast, when the lithium source and a boron raw material are added to the nickel-based metal composite hydroxide (which is a precursor of the positive active material) and heat-treated to obtain a positive active material according to embodiments of the present disclosure, boron is coated on the surface of the positive active material as well as on internal grain boundaries. When an appropriate or suitable amount of boron is coated on the grain boundary inside the positive active material and on the surface of the positive active material at the same time (e.g., simultaneously), boron no longer acts as a resistance, structural stability of the positive active material may be ensured, initial discharge capacity of the battery does not decrease (e.g., may be maintained), and cycle-life characteristics may be improved.

The first boron coating portion and the second boron coating portion each include a compound containing boron, for example, boron oxide, lithium borate, or a combination thereof, for example, $B_2O_2$, $B_2O_3$, $B_4O_3$, $B_4O_5$, $LiBO_2$, $Li_2B_4O_7$, $Li_3BO_3$, or a combination thereof.

The second boron coating portion may be included in an amount of about 2 wt % to about 30 wt %, and for example about 2 wt % to about 20 wt %, about 2 wt % to about 15 wt %, about 2 wt % to about 10 wt %, or about 5 wt % to about 20 wt %, and the first boron coating portion may be included in an amount of about 70 wt % to about 98 wt %, about 80 wt % to about 98 wt %, about 85 wt % to about 98 wt %, about 90 wt % to about 98 wt %, or about 80 wt % to about 95 wt %, each based on the total amount (e.g., weight) of the first boron coating portion and the second boron coating portion. For example, the weight ratio of the first boron coating portion to the second boron coating portion may be about 70:30 to about 98:2, for example, about 80:20 to about 95:5. When the content (e.g., weight) ratio of the first boron coating portion and the second boron coating portion is as described, boron may not act as a resistance in the positive active material and may serve to improve performance, and the positive active material including such a boron coating portion may exhibit improved cycle-life characteristics while implementing a high capacity.

The content (e.g., amount) of the first boron coating portion may be, for example, about 200 ppm to about 5000 ppm, about 300 ppm to about 5000 ppm, or about 500 ppm to about 4000 ppm based on the positive active material. The content (e.g., amount) of the second boron coating portion may be, for example, about 10 ppm to about 500 ppm, about 10 ppm to about 400 ppm, about 10 ppm to about 300 ppm, or about 30 ppm to about 200 ppm based on the positive active material, but is not limited thereto. When the contents of the first boron coating portion and the second boron coating portion based on the positive active material are each as described above, boron may not act as a resistance in the positive active material, and the positive active material including the same may exhibit high capacity and/or excellent or suitable cycle-life characteristics.

Here, "ppm" (parts per million) is a unit expression based on weight, that is, 1 ppm may refer to $10^{-4}$ wt %. Therefore, the content (e.g., amount) of the first boron coating portion may be about 0.02 wt % to about 0.5 wt %, about 0.03 wt % to about 0.5 wt %, or about 0.05 wt % to about 0.4 wt % based on the weight of the positive active material, and the content (e.g., amount) of the second boron coating portion may be about 0.001 wt % to about 0.05 wt %, about 0.001 wt % to about 0.04 wt %, about 0.001 wt % to about 0.03 wt %, or about 0.003 wt % to about 0.02 wt % based on the total weight of the positive active material.

A total amount of the first boron coating portion and the second boron coating portion may be about 0.1 mol % to about 5 mol %, for example about 0.1 mol % to about 4 mol %, about 0.1 mol % to about 3 mol %, about 0.1 mol % to about 2.9 mol %, about 0.1 mol % to about 2.5 mol %, about 0.1 mol % to about 2 mol %, about 0.1 mol % to about 1.5 mol %, about 0.1 mol % to about 1.3 mol %, or about 0.5 mol % to about 1.3 mol % based on 100 mol % of the positive active material, When the total amount of the first boron coating portion and the second boron coating portion is outside of the above-described example ranges, initial discharge capacity may decrease and/or cycle-life characteristics may be deteriorated. For example, when the content (e.g., amount) of the first boron coating on the surface of the secondary particles of the positive active material is excessive, the initial discharge capacity may be greatly reduced because boron may act as a resistance.

The lithium nickel-based metal composite oxide may be, for example, a nickel-based oxide having a relatively high nickel content (e.g., with respect to other metals in the material). For example, in the lithium nickel-based metal composite oxide, the nickel content (e.g., amount) may be greater than or equal to about 60 mol %, greater than or equal to about 70 mol %, greater than or equal to about 80 mol %, greater than or equal to about 83 mol %, greater than or equal to about 90 mol % or greater than or equal to about 92 mol %, and less than or equal to about 99.9 mol %, less than or equal to about 99 mol %, or less than or equal to about 98 mol % based on the total amount (e.g., 100 mol %) of metals excluding lithium. As such, when the nickel content (e.g., amount) is high, a high-capacity battery may be realized.

However, as the nickel content (e.g., amount) is increased, cation mixing (in which $Ni^{2+}$ ions take lithium sites) also increases, such that capacity may be rather decreased. Moreover, because diffusion of lithium ions is hindered by impurities such as NiO and/or the like (which may increase as the result of the increased nickel content), battery cycle-life may be deteriorated, and in addition, there may be a battery safety problem due to side reactions of the impurities on the surface of the positive active material and an electrolyte. When boron is coated only on the outer surface of the active material in the related art, the boron acts as resistance and decreases capacity and/or cycle-life. In contrast, the positive active material according to an embodiment is coated with boron in an appropriate or suitable amount on the outer surfaces and the internal grain boundaries of the active material secondary particles, and thus may improve the problems caused by high nickel concentrations, realize high capacity, and concurrently (e.g., simultaneously) improve cycle-life characteristics without deteriorating initial discharge capacity.

The lithium nickel-based metal composite oxide may be, for example, represented by Chemical Formula 1:

Chemical Formula 1

$Li_{a1}Ni_{x1}M^1_{y1}M^2_{1-x1-y1}O_2$.

In Chemical Formula 1, $0.9 \leq a1 \leq 1.8$, $0.6 \leq x1 \leq 1$, $0 \leq y1 \leq 0.4$, and $M^1$ and $M^2$ may each independently be selected from aluminum (Al), boron (B), barium (Ba), calcium (Ca), cerium (Ce), cobalt (Co), chromium (Cr), copper (Cu), fluorine (F), iron (Fe), magnesium (Mg), manganese (Mn), molybdenum (Mo), niobium (Nb), phosphorus (P), sulfur (S), silicon (Si), strontium (Sr), titanium (Ti), vanadium (V), tungsten (W), zirconium (Zr), and combinations thereof.

In Chemical Formula 1, x1 and y1 may be, for example, in the ranges: $0.65 \leq x1 < 1$ and $0 \leq y1 \leq 0.35$, $0.70 \leq x1 < 1$ and $0 \leq y1 \leq 0.30$, $0.80 \leq x1 < 1$ and $0 \leq y1 \leq 0.20$, or $0.92 \leq x1 < 1$ and $0 \leq y1 \leq 0.08$. In this case, the positive active material including the same may realize high capacity and/or exhibit excellent or suitable battery characteristics.

In some embodiments, the lithium nickel-based metal composite oxide may be represented by Chemical Formula 2 or Chemical Formula 3:

Chemical Formula 2

$Li_{a2}Ni_{x2}Co_{y2}Al_{z2}M^3_{1-x2-y2-z2}O_2$.

In Chemical Formula 2, $0.9 \leq a2 \leq 1.8$, $0.6 \leq x2 < 1$, $0 < y2 < 0.4$, $0 < z2 < 0.4$, and $M^3$ may be selected from B, Ba, Ca, Ce, Co, Cr, Cu, F, Fe, Mg, Mn, Mo, Nb, P, S, Si, Sr, Ti, V, W, Zr, and combinations thereof.

Chemical Formula 3

$Li_{a3}Ni_{x3}Co_{y3}M^4_{1-x3-y3}O_2$

In Chemical Formula 3, $0.9 \leq a3 \leq 1.8$, $0.6 \leq x3 < 1$, $0 < y3 \leq 0.4$, and $M^4$ is selected from B, Ba, Ca, Ce, Co, Cr, Cu, F, Fe, Mg, Mn, Mo, Nb, P, S, Si, Sr, Ti, V, W, Zr and combinations thereof.

When the lithium nickel-based metal composite oxide is a compound represented by Chemical Formula 2 or Chemical Formula 3, the effect of improving battery performance by including the first boron coating portion and the second boron coating portion may be higher (e.g., amplified). For example, the initial discharge capacity is not lowered while implementing a high capacity, and the effect of improving cycle-life characteristics can be obtained.

In Chemical Formula 2, x2, y2, and z2 may be, for example, in the range: $0.70 \leq x2 < 1$, $0 < y2 < 0.30$, and $0 < z2 < 0.30$, $0.8 \leq x2 < 1$, $0 < y2 < 0.2$, and $0 < z2 < 0.2$, or $0.93 \leq x2 < 1$, $0 < y2 < 0.07$, and $0 < z2 < 0.07$. In some embodiments, in Chemical Formula 3, x3 and y3 may be, for example, in the range: $0.70 \leq x3 < 1$ and $0 < y3 \leq 0.30$, $0.8 \leq x3 < 1$ and $0 < y3 \leq 0.2$, or $0.90 \leq x3 \leq 0.99$ and $0.01 \leq y3 \leq 0.10$.

In an embodiment, a method of preparing a positive active material for a rechargeable lithium battery includes mixing a nickel-based metal composite hydroxide, a lithium raw material, and a boron raw material to obtain a mixture, and heat-treating the mixture to obtain the above-described positive active material.

In the related art, when boron is coated on a positive active material, a lithium raw material is commonly mixed with a nickel-based metal composite hydroxide followed by heat-treating the resultant to prepare a lithium nickel-based metal composite oxide, and a boron source is mixed therewith by a wet or dry method, followed by performing heat-treatment again. In this case, only the surface of the positive active material is coated with boron, and thus boron acts as a resistance, thereby reducing capacity and cycle-life. According to an embodiment, a positive active material coated with boron not only on the surface of the positive active material but also on grain boundaries inside the positive active material may be obtained.

In the preparing method, the nickel-based metal composite hydroxide is a precursor of the positive active material, may be prepared by utilizing a general co-precipitation method, and may be, for example, represented by Chemical Formula 11:

Chemical Formula 11

$Ni_{x11}M^{11}_{y11}M^{12}_{1-x11-y11}(OH)_2$.

In Chemical Formula 11, $0.6 \leq x11 \leq 1$, $0 \leq y11 \leq 0.4$, and $M^{11}$ and $M^{12}$ may each independently be selected from Al, B, Ba, Ca, Ce, Co, Cr, Cu, F, Fe, Mg, Mn, Mo, Nb, P, S, Si, Sr, Ti, V, W, Zr, and combinations thereof.

As a specific example, the nickel-based metal composite hydroxide may be represented by Chemical Formula 12 or 13:

$$Ni_{x12}Co_{y12}Al_{z12}M^{13}{}_{1-x12-y12-z12}(OH)_2. \quad \text{Chemical Formula 12}$$

In Chemical Formula 12, $0.6 \leq x12 < 1$, $0 < y12 < 0.4$ and $0 < z12 < 0.4$, and $M^{13}$ may be selected from B, Ba, Ca, Ce, Co, Cr, Cu, F, Fe, Mg, Mn, Mo, Nb, P, S, Si, Sr, Ti, V, W, Zr, and combinations thereof.

$$Ni_{x13}Co_{y13}M^{14}{}_{1-x13-y13}(OH)_2 \quad \text{Chemical Formula 13}$$

In Chemical Formula 13, $0.6 \leq x13 < 1$, $0 < y13 \leq 0.4$, and $M^{14}$ may be selected from B, Ba, Ca, Ce, Co, Cr, Cu, F, Fe, Mg, Mn, Mo, Nb, P, S, Si, Sr, Ti, V, W, Zr, and combinations thereof.

In the preparing method, the lithium raw material may be, for example, lithium hydroxide, etc., and may be mixed in a ratio (e.g., amount) of about 0.8 mole to about 1.8 mole, or about 0.8 mole to about 1.2 mole based on 1 mole of the nickel-based metal composite hydroxide.

The boron raw material may be a compound containing boron, for example, $H_3BO_3$, $B_2O_3$, $C_6H_5B(OH)_2$, $(C_6H_5O)_3B$, $[CH_3(CH_2)_3O]_3B$, $(C_3H_7O)_3B$, $C_3H_9B_3O_6$, $C_{13}H_{19}BO_3$, or any combination thereof. The content (e.g., amount) of the boron raw material may be about 0.1 mol % to about 5 mol %, for example about 0.1 mol % to about 4 mol %, about 0.1 mol % to about 3 mol %, about 0.1 mol % to about 2.9 mol %, about 0.1 mol % to about 2.5 mol %, about 0.1 mol % to about 2 mol %, about 0.1 mol % to about 1.5 mol %, or about 0.5 mol % to about 1.3 mol %, based on 100 mol % of the nickel-based metal composite hydroxide. When the content (e.g., amount) of boron raw material satisfies the above range, boron may not act as a resistance in the positive active material, and may serve to improve battery performance, thereby improving battery capacity and improving cycle-life characteristics. When the content (e.g., amount) of the boron raw material is excessive, the content (e.g., amount) of the first boron coating portion is excessively increased, and boron acts as a resistance in the positive active material, thereby reducing the capacity and cycle-life of the battery.

The heat-treating of the mixture may be performed, for example, at a temperature of about 650° C. to about 850° C., or about 690° C. to about 780° C. In this case, the positive active material having a stable structure while including both (e.g., simultaneously) the first boron coating portion and the second boron coating portion may be prepared.

In some embodiments, the heat-treatment of the mixture may be performed for about 5 hours to about 15 hours, for example, about 8 hours to about 12 hours. Within this range, a positive active material having a stable structure including both (e.g., simultaneously) the first boron coating portion and the second boron coating portion is prepared.

Positive Electrode

A positive electrode for a rechargeable lithium battery may include a current collector and a positive active material layer on the current collector. The positive active material layer may include a positive active material, and may further include a binder and/or a conductive material.

The binder improves the binding properties of positive active material particles with one another and with a current collector. Examples thereof may be or include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The content (e.g., amount) of the binder in the positive active material layer may be about 1 wt % to about 5 wt % based on the total weight of the positive active material layer.

The conductive material is included to provide or increase electrode conductivity. Any electrically conductive material may be utilized as a conductive material unless it causes an unwanted chemical change. Examples of the conductive material may include a carbon-based material (such as natural graphite, artificial graphite, carbon black, acetylene black, ketjen black, a carbon fiber, and/or the like); a metal-based material of a metal powder or a metal fiber including copper, nickel, aluminum, silver, and/or the like; a conductive polymer (such as a polyphenylene derivative); and mixtures thereof.

The content (e.g., amount) of the conductive material in the positive active material layer may be about 1 wt % to about 5 wt % based on the total weight of the positive active material layer.

An aluminum foil may be utilized as the current collector, but is not limited thereto.

Negative Electrode

A negative electrode for a rechargeable lithium battery includes a current collector and a negative active material layer on the current collector. The negative active material layer may include a negative active material, and may further include a binder and/or a conductive material.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include, for example crystalline carbon and/or amorphous carbon as a carbon-based negative active material. The crystalline carbon may be non-shaped (e.g., carbon not having a particular or set shape), and/or sheet, flake, spherical, and/or fiber shaped natural graphite and/or artificial graphite. The amorphous carbon may be a soft carbon, a hard carbon, a mesophase pitch carbonization product, calcined coke, and/or the like.

The lithium metal alloy may be an alloy including lithium and one or more metals selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be a Si-based negative active material or a Sn-based negative active material. The Si-based negative active material may include silicon, a silicon-carbon composite, $SiO_x$ ($0 < x < 2$), a Si-Q alloy (wherein Q is an alkali metal, an alkaline-earth metal, a Group 13 element, a Group 14 element excluding Si, a Group 15 element, a Group 16 element, a transition metal, a rare earth element, or any combination thereof) and the Sn-based negative active material may include Sn, $SnO_2$, Sn—R alloy (wherein R is an alkali metal, an alkaline-earth metal, a Group 13 element, a Group 14 element excluding Sn, a Group 15 element, a Group 16 element, a transition metal, a rare earth element, or any combination thereof). At least one of these materials may be mixed with $SiO_2$. The elements Q and R may each independently be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), and a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, and/or a polymer resin (such as a phenol resin, a furan resin, and/or a polyimide resin). In this case, the content (e.g., amount) of silicon may be about 10 wt % to about 50 wt % based on the total weight of the silicon-carbon composite. In some embodiments, the content (e.g., amount) of the crystalline carbon may be about 10 wt % to about 70 wt % based on the total weight of the silicon-carbon composite, and the content (e.g., amount) of the amorphous carbon may be about 20 wt % to about 40 wt % based on the total weight of the silicon-carbon composite. In some embodiments, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may be present in an oxidized form, and in this case, an atomic ratio of Si:O in the silicon particles (indicating a degree of oxidation) may be about 99:1 to about 33:67. The silicon particles may be $SiO_x$ particles, and in this case, the range of x in $SiO_x$ may be greater than about 0 and less than about 2.

The Si-based negative active material or Sn-based negative active material may be mixed with the carbon-based negative active material. When the Si-based negative active material or Sn-based negative active material and the carbon-based negative active material are mixed and utilized, the mixing ratio may be a weight ratio of about 1:99 to about 90:10.

In the negative active material layer, the negative active material may be included in an amount of about 95 wt % to about 99 wt % based on the total weight of the negative active material layer.

In one embodiment, the negative active material layer further includes a binder, and may optionally further include a conductive material. The content (e.g., amount) of the binder in the negative active material layer may be about 1 wt % to about 5 wt % based on the total weight of the negative active material layer. In some embodiments, when the conductive material is further included, the negative active material layer may include about 90 wt % to about 98 wt % of the negative active material, about 1 wt % to about 5 wt % of the binder, and about 1 wt % to about 5 wt % of the conductive material.

The binder may aid in adhering the negative active material particles to each other and to the current collector. The binder may be a water-insoluble binder, a water-soluble binder, or a combination thereof.

Examples of the water-insoluble binder may be or include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamideimide, polyimide, and combinations thereof.

The water-soluble binder may include a rubber binder and/or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and combinations thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and combinations thereof.

When a water-soluble binder is utilized as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and utilized. As the alkali metal, Na, K, or Li may be utilized. The amount of the thickener utilized may be about 0.1 parts by weight to about 3 parts by weight based on 100 parts by weight of the negative active material.

The conductive material may provide increased electrode conductivity. Any electrically conductive material may be utilized as a conductive material unless it causes an unwanted chemical change. Examples of the conductive material may include a carbon-based material (such as natural graphite, artificial graphite, carbon black, acetylene black, ketjen black, a carbon fiber, and/or the like); a metal-based material of a metal powder or a metal fiber including copper, nickel, aluminum silver, and/or the like; a conductive polymer (such as a polyphenylene derivative); and mixtures thereof.

The current collector may include one selected from a copper foil, a nickel foil, a stainless steel foil, a titanium foil, a nickel foam, a copper foam, a polymer substrate coated with a conductive metal, and combinations thereof.

Rechargeable Lithium Battery

Another embodiment provides a rechargeable lithium battery including a positive electrode, a negative electrode, a separator between the positive electrode and the negative electrode, and an electrolyte impregnated in the electrodes and separator. Here, the aforementioned electrode may be the positive electrode and negative electrode.

Figure 1:
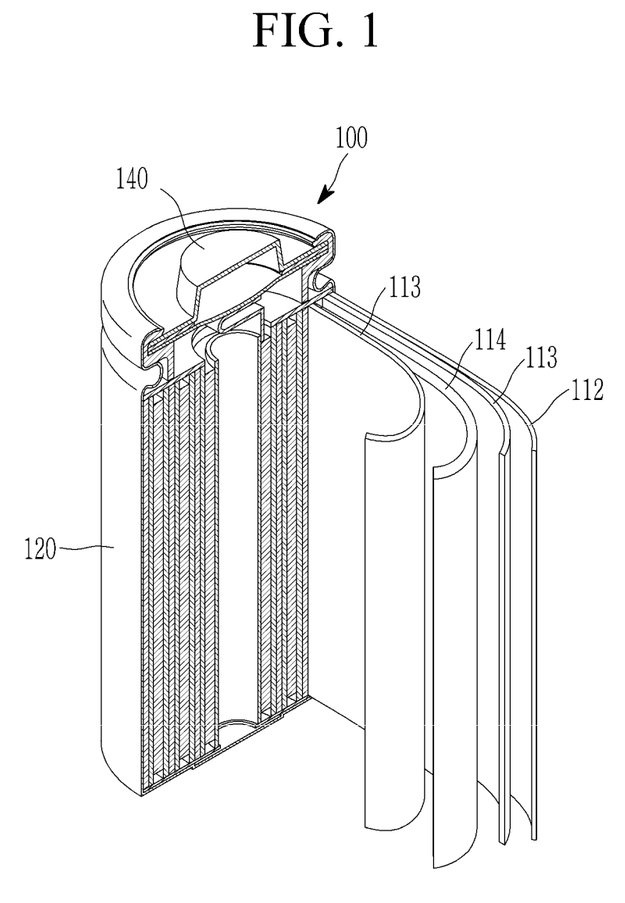
FIG. 1 is a schematic view illustrating a rechargeable lithium battery according to an embodiment.

FIG. 1 is a schematic view illustrating a rechargeable lithium battery according to an embodiment. Referring to FIG. 1, a rechargeable lithium battery 100 according to an embodiment of the present disclosure includes a battery cell including a positive electrode 114, a negative electrode 112 facing the positive electrode 114, a separator 113 between the positive electrode 114 and the negative electrode 112, an electrolyte impregnating the positive electrode 114, negative electrode 112, and separator 113, a battery case 120 housing the battery cell, and a sealing member 140 sealing the battery case 120.

The electrolyte includes a non-aqueous organic solvent and a lithium salt.

The non-aqueous organic solvent serves as a medium for transmitting ions taking part in the electrochemical reaction of a battery. The non-aqueous organic solvent may be or include a carbonate-based, ester-based, ether-based, ketone-based, alcohol-based solvent, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and/or the like. The ether-based solvent may be or include dibutyl ether, tetraglyme, diglyme, dimethoxyethane, 2-methyltetrahydrofuran, tetrahydrofuran, and/or the like, and the ketone-based solvent may be cyclohexanone, and/or the like. In some embodiments, the alcohol-based solvent may be ethyl alcohol, isopropyl alcohol, etc. and the aprotic solvent may be or include nitriles (such as R—CN, where R is a C2 to C20 linear, branched, or cyclic hydrocarbon group and may include a double bond, an aromatic ring, and/or an ether bond), amides (such as dimethylformamide), dioxolanes (such as 1,3-dioxolane), sulfolanes, and/or the like.

The non-aqueous organic solvent may be utilized alone or in a mixture. When the organic solvent is utilized in a mixture, the mixture ratio may be controlled or selected in accordance with a desirable battery performance.

In some embodiments, in the case of the carbonate-based solvent, a mixture of a cyclic carbonate and a chain carbonate may be utilized. In this case, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

The aromatic hydrocarbon-based solvent may be an aromatic hydrocarbon-based compound represented by Chemical Formula I:

Chemical Formula I

In Chemical Formula I, $R^4$ to $R^9$ may be the same or different, and may be selected from hydrogen, a halogen, a C1 to C10 alkyl group, a haloalkyl group, and combinations thereof.

Examples of the aromatic hydrocarbon-based solvent may be or include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-tichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include vinylene carbonate and/or an ethylene carbonate-based compound represented by Chemical Formula II in order to improve battery cycle-life:

Chemical Formula II

In Chemical Formula II, $R^{10}$ and $R^{11}$ may be the same or different, and selected from hydrogen, a halogen, a cyano group, a nitro group, and fluorinated C1 to C5 alkyl group, provided that at least one selected from $R^{10}$ and $R^{11}$ is a halogen, a cyano group, a nitro group, or fluorinated C1 to C5 alkyl group, and $R^{10}$ and $R^{11}$ are not concurrently (e.g., simultaneously) hydrogen.

Examples of the ethylene-based carbonate-based compound may be or include difluoroethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be within an appropriate or suitable range.

The lithium salt dissolved in the non-aqueous solvent supplies lithium ions in a battery, enables basic operation of a rechargeable lithium battery, and improves transportation of the lithium ions between positive and negative electrodes.

Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer ranging from 1 to 20, lithium difluoro(bis(oxolato)) phosphate, LiCl, LiI, $LiB(C_2O_4)_2$ (lithium bis(oxalato) borate: LiBOB), and/or lithium difluoro(oxalato)borate (LiDFOB).

The lithium salt may be utilized in a concentration ranging from about 0.1 M to about 2.0 M. When the lithium salt is included at the above concentration range, an electrolyte may have excellent or suitable performance and lithium ion mobility due to optimal or suitable electrolyte conductivity and viscosity.

The separator 113 separates the positive electrode 114 and the negative electrode 112, provides a transporting passage for lithium ions, and may be any generally-utilized separator in a lithium ion battery. For example, the separator may have low resistance to ion transport and/or excellent or suitable electrolyte impregnation. For example, the separator may be selected from a glass fiber, polyester, Teflon, polyethylene, polypropylene, polytetrafluoroethylene, and combinations thereof. It may have a form of a non-woven fabric or a woven fabric. For example, in a lithium ion battery, a polyolefin-based polymer separator (such as polyethylene and/or polypropylene) is mainly utilized. In order to ensure the heat resistance or mechanical strength, a coated separator including a ceramic component or a polymer material may be utilized. Optionally, the separator may have a mono-layered or multi-layered structure.

Rechargeable lithium batteries may be classified as lithium ion batteries, lithium ion polymer batteries, or lithium polymer batteries according to the presence of a separator and the type or kind of electrolyte utilized therein. The rechargeable lithium batteries may have a variety of shapes and sizes, may be cylindrical, prismatic, coin, and/or pouch-type or format batteries, and may be thin film batteries or may be rather bulky in size. Suitable structures and manufacturing methods for lithium ion batteries pertaining to this disclosure are well known in the art.

Hereinafter, examples of the present disclosure and comparative examples are described. However, the present disclosure is not limited thereto.

Example 1

1. Preparation of Positive Active Material Precursor

First, ammonia water having a concentration of 0.25 M is put into the reactor. Metal raw materials and a complex agent are added thereto respectively at 142 mL/min and 34 mL/min at 50° C. under a stirring power of 3.0 kW/m$^3$, and a reaction is started. Here, nickel sulfate, cobalt sulfate, and aluminum nitrate are utilized as metal raw materials. NaOH is added thereto to maintain pH, and the reaction is performed for 30 hours. As a result of the reaction, the reaction is terminated when the average size of the obtained core particles reaches 4 μm. The obtained product is washed and then dried with hot air at about 150° C. for 24 hours to obtain a nickel-based metal composite hydroxide ($Ni_{0.945}Co_{0.04}Al_{0.015}(OH)_2$), which is a positive active material precursor.

2. Preparation of Positive Active Material

The obtained nickel-based metal composite hydroxide (which is a positive active material precursor) and LiOH are mixed in a mole ratio of 1:1, 0.5 mol % of boric acid based on the positive active material precursor is added thereto, and heat-treatment at 725° C. is performed in an oxygen atmosphere for 10 hours to thereby obtain a lithium nickel-based metal composite oxide ($LiNi_{0.945}Co_{0.04}Al_{0.015}O_2$) coated with a boron compound on the inner grain boundary and on the surface.

3. Manufacture of Positive Electrode 95 wt % of the obtained positive active material, 3 wt % of a polyvinylidene fluoride binder, and 2 wt % of a ketjen black conductive material are mixed in an N-methylpyrrolidone solvent to prepare a positive active material slurry. The positive active material slurry is applied to an aluminum current collector, dried, and then compressed to manufacture a positive electrode.

4. Manufacture of Rechargeable Lithium Battery Cell

A coin half-cell is manufactured by disposing a separator having a polyethylene polypropylene multilayer structure between the manufactured positive electrode and lithium metal counter electrode, and injecting an electrolyte solution (in which 1.0 M $LiPF_6$ lithium salt was added to ethylene carbonate and diethyl carbonate mixed in a volume ratio of 50:50).

Example 2

A positive active material, a positive electrode, and a battery cell are manufactured in substantially the same manner as in Example 1, except that 1.0 mol % of boric acid is added in the preparation of the positive active material of Example 1.

Example 3

A positive active material, a positive electrode, and a battery cell are manufactured in substantially the same manner as in Example 1, except that 1.5 mol % of boric acid is added in the preparation of the positive active material of Example 1.

Example 4

A positive active material, a positive electrode, and a battery cell are manufactured in substantially the same manner as in Example 1, except that 3.0 mol % of boric acid is added in the preparation of the positive active material of Example 1.

Example 5

A positive active material, a positive electrode, and a battery cell are manufactured in substantially the same manner as in Example 1, except that 5.0 mol % of boric acid is added in the preparation of the positive active material of Example 1.

Comparative Example 1

A positive active material, a positive electrode, and a battery cell are manufactured in substantially the same manner as in Example 1, except that boric acid is not added in the preparation of the positive active material of Example 1.

Comparative Example 2

A positive active material, a positive electrode, and a battery cell are manufactured in substantially the same manner as in Comparative Example 1 except that a positive active material is prepared in substantially the same manner as in Comparative Example 1, and then is additionally heat-treated at 350° C. for 8 hours under an oxygen atmosphere.

Comparative Example 3

A positive active material is prepared in substantially the same manner as in Comparative Example 1, and the, coated with a boron compound in a related art method. For example, the positive active material of Comparative Example 1 is mixed with 0.5 mol % of boric acid and then, heat-treated under an oxygen atmosphere at 350° C. for 8 hours, obtaining a nickel-based metal composite oxide ($LiNi_{0.945}Co_{0.04}Al_{0.015}O_2$) coated with the boron compound on the surface. A positive electrode and a battery cell are manufactured in substantially the same manner as in Example 1, except that this positive active material is utilized.

Comparative Example 4

A positive active material, a positive electrode, and a battery cell are manufactured in substantially the same manner as in Comparative Example 3, except that the boric acid is added in an amount of 1.0 mol %.

Comparative Example 5

A positive active material, a positive electrode, and a battery cell are manufactured in substantially the same manner as in Comparative Example 3, except that the boric acid is added in an amount of 1.5 mol %.

Comparative Example 6

A positive active material, a positive electrode, and a battery cell are manufactured in substantially the same manner as in Comparative Example 3, except that the boric acid is added in an amount of 3.0 mol %.

Example 6

1. Preparation of Positive Active Material Precursor

First, ammonia water having a concentration of 0.25 M was put into the reactor. Metal raw materials and a complex agent are added thereto respectively at 142 mL/min and 34 mL/min at 50° C. under a stirring power of 3.0 kW/m$^3$, and a reaction is started. Here, nickel sulfate and cobalt sulfate are utilized as metal raw materials. NaOH is added thereto to maintain pH, and the reaction is performed for 23 hours. The reaction is terminated when the average size of the obtained core particles reaches 3 μm. The obtained product is washed and then dried with hot air at about 150° C. for 24 hours to obtain a nickel-based metal composite hydroxide ($Ni_{0.9}Co_{0.1}(OH)_2$), which is a positive active material precursor.

2. Preparation of Positive Active Material

The obtained nickel-based metal composite hydroxide (which is a positive active material precursor and LiOH) are mixed in a mole ratio of 1:1, 0.5 mol % of boric acid based on the positive active material precursor is added thereto, and heat-treatment at 725° C. is performed in an oxygen atmosphere for 10 hours to thereby obtain a lithium nickel-based metal composite oxide ($LiNi_{0.9}Co_{0.1}O_2$) coated with a boron compound on the inner grain boundary and on the surface.

Thereafter, a positive electrode and a battery cell are manufactured in substantially the same manner as in Example 1.

Example 7

A positive active material, a positive electrode, and a battery cell are manufactured in substantially the same manner as in Example 6, except that 1.0 mol % of boric acid is added in the preparation of the positive active material of Example 6.

Example 8

A positive active material, a positive electrode, and a battery cell are manufactured in substantially the same manner as in Example 6, except that 1.5 mol % of boric acid is added in the preparation of the positive active material of Example 6.

Example 9

A positive active material, a positive electrode, and a battery cell are manufactured in substantially the same manner as in Example 6, except that 3.0 mol % of boric acid is added in the preparation of the positive active material of Example 6.

Comparative Example 7

A positive active material, a positive electrode, and a battery cell are manufactured in substantially the same manner as in Example 6, except boric acid is not added in the preparation of the positive active material of Example 6.

Table 1 summarizes the design contents of the Examples and the Comparative Examples. Here, "NCA" refers to a nickel cobalt aluminum positive active material, and "NC" refers to a nickel cobalt positive active material.

TABLE 1

| NCA novel boron coating | | NCA related art boron coating | | NC novel boron coating | |
|---|---|---|---|---|---|
| | Addition amount of boron (mol %) | | Addition amount of boron (mol %) | | Addition amount of boron (mol %) |
| Comparative Example 1 | 0 | Comparative Example 2 | 0.0 | Comparative Example 7 | 0.0 |
| Example 1 | 0.5 | Comparative Example 3 | 0.5 | Example 6 | 0.5 |
| Example 2 | 1.0 | Comparative Example 4 | 1.0 | Example 7 | 1.0 |
| Example 3 | 1.5 | Comparative Example 5 | 1.5 | Example 8 | 1.5 |
| Example 4 | 3.0 | Comparative Example 6 | 3.0 | Example 9 | 3.0 |

Evaluation Example 1: Evaluation of Boron Content in Internal Portion (Grain Boundaries) of Positive Active Material The positive active materials according to Examples 1 to 5 and 7 and Comparative Examples 1, 4, and 6 were measured with respect to a boron content (e.g., amount) through an ICP emission spectroscopy analysis. After adding 10 g of each positive active material to 100 g of distilled water, and then stirring the mixture for 30 minutes, the positive active material was filtered therefrom. All boron present on the surface of the positive active material is removed through this washing process. The recovered positive active material is dried at 130° C. for 24 hours and analyzed through ICP emission spectroscopy to measure a boron content (e.g., amount) remaining in the positive active material, for example, the boron present in the internal portion of the positive active material, that is, on the grain boundaries. A boron content (e.g., amount) difference obtained by subtracting the boron content after the washing from the boron content before the washing, for example, a content of boron removed through the washing, is expressed as a content of boron present on the surface of the positive active material. In Table 2, a ppm unit is based on a weight, and 1 ppm is 104 wt %. Here, "ND" indicates "not detected", e.g., a boron amount below the detection threshold.

wherein a ratio of discharge capacity relative to charge capacity is calculated as efficiency. The coin half-cells are additionally charged at a constant current of 1C up to an upper limit voltage of 4.3 V and discharged at 1C down to a discharge cut-off voltage of 3.0 V at 45° C. and then, measured with respect to initial discharge capacity and also, with respect to discharge capacity, when continuously 50 times charged and discharged, to evaluate capacity retention at the $50^{th}$ charge and discharge.

TABLE 3

| | NCA novel boron coating | | | | NCA related art boron coating | | | |
|---|---|---|---|---|---|---|---|---|
| | Addition amount of boron (mol %) | Discharge capacity (mAh/g) | Efficiency | Capacity retention (50 cycles) | | Addition amount of boron (mol %) | Discharge capacity (mAh/g) | Efficiency | Capacity retention (50 cycles) |
| Comparative Example 1 | 0 | 228.5 | 93.60% | 75.60% | Comparative Example 2 | 0.0 | 224.8 | 95.3% | 84.80% |
| Example 1 | 0.5 | 231.3 | 94.40% | 91.40% | Comparative Example 3 | 0.5 | 224.6 | 94.80% | 88.30% |
| Example 2 | 1.0 | 232.4 | 94.60% | 93.50% | Comparative Example 4 | 1.0 | 224.2 | 94.80% | 88.10% |
| Example 3 | 1.5 | 229.2 | 94.00% | 93.00% | Comparative Example 5 | 1.5 | 221.9 | 94.20% | 88.90% |
| Example 4 | 3.0 | 213.3 | 92.80% | 91.70% | Comparative Example 6 | 3.0 | 210.7 | 91.80% | 89.70% |
| Example 5 | 5.0 | 187.3 | 90.00% | 84.40% | | | | | |

TABLE 2

| | Boron content at the grain boundary (ppm) | Boron content on the surface (ppm) |
|---|---|---|
| Comparative Example 1 | ND | ND |
| Comparative Example 4 | ND | 1020 |
| Comparative Example 6 | ND | 3030 |
| Example 1 | 30 | 510 |
| Example 2 | 50 | 1050 |
| Example 3 | 130 | 1400 |
| Example 4 | 120 | 2550 |
| Example 5 | 130 | 3930 |
| Example 7 | 185 | 755 |

Referring to Table 2, in the positive active material of Comparative Example 1 in which boron coating does not proceed, the boron does not exist (e.g., is not detected) at the grain boundaries and on the surface, and in the positive active materials of Comparative Examples 4 and 6 in which the boron coating proceeds in a related art coating method, there is no remaining boron, that is, the boron is not coated to the grain boundaries but coated only on the surface. In contrast, in the active materials of Examples 1 to 5 and 7, even after the boron on the surface is removed during the washing of the active materials, boron is present, that is, detected as being coated on the grain boundaries inside the active materials (which are not reached by distilled water).

Evaluation Example 2: Evaluation of Cell Performance

The coin half-cells according to Examples 1 to 7 and Comparative Examples 1 to 7 are charged at a constant current of 0.2C up to a voltage of 4.25 V and discharged at 0.2C down to a discharge cut-off voltage of 3.0 V at 25° C. and then, measured with respect to initial discharge capacity,

TABLE 4

| | NC novel boron coating | | | |
|---|---|---|---|---|
| | Addition amount of boron (mol %) | Discharge capacity (mAh/g) | Efficiency | Capacity retention (50 cycles) |
| Comparative Example 7 | 0.0 | 224.2 | 95.30% | 75.60% |
| Example 6 | 0.5 | 224.6 | 95.20% | 90.80% |
| Example 7 | 1.0 | 223.7 | 94.30% | 94.40% |

Referring to Tables 3 and 4, Comparative Examples 1, 2, and 7 (in which the boron coating does not proceed (e.g., is not applied) each exhibit comparatively decreased capacity retention, and Comparative Examples 3 to 6, in which the boron coating proceeds only on the surface of the positive active materials (e.g., the outermost surfaces of the secondary particles), exhibit low capacity retention and also, low discharge capacity, compared with the examples in which the boron coating proceeds in the same amount. The reason is that the boron compound coated on the surface of the active materials acts only as resistance (e.g., contributes to increased resistance without providing the capacity-related benefits of coating the primary particles). In contrast, Examples 1 to 7, in which boron is coated on the surface of the active materials and at the grain boundaries thereof, all exhibit improved discharge capacity and/or capacity retention.

Figure 2:
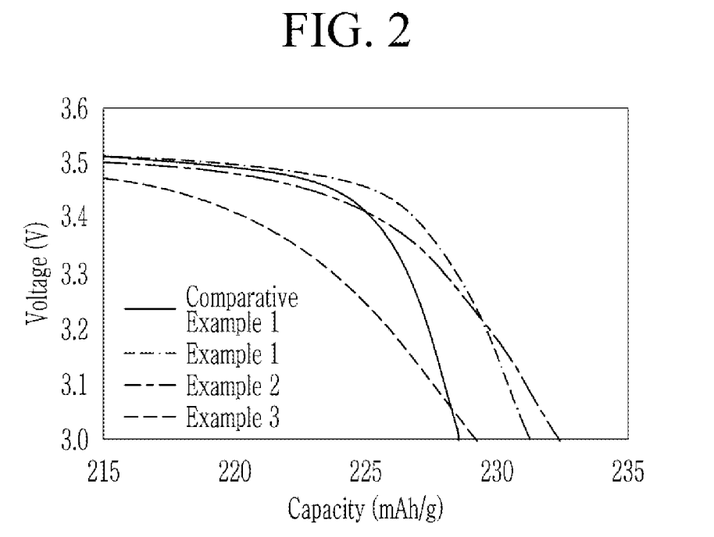
FIG. 2 is a graph schematically illustrating voltages for each capacity during initial discharge of the battery cells of Comparative Example 1 and Examples 1 to 3.
Figure 3:
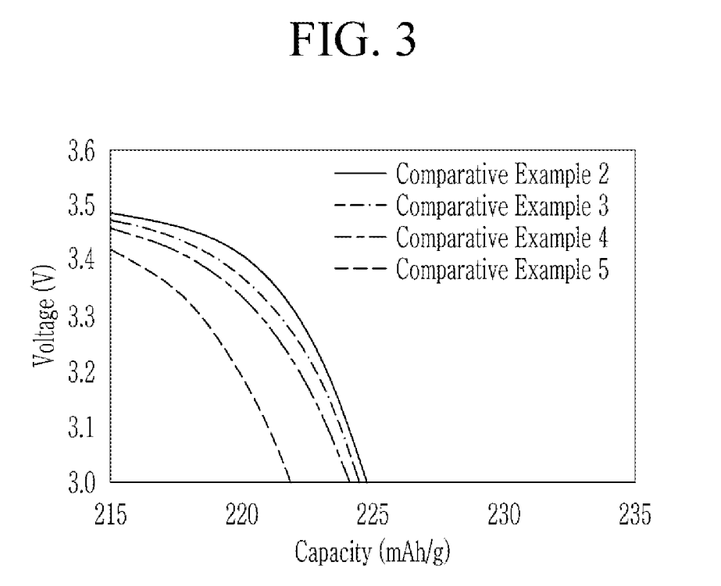
FIG. 3 is a graph schematically illustrating voltages by capacity during initial discharge of the battery cells of Comparative Examples 2 to 5.

FIGS. 2 and 3 are graphs of voltage vs. cell capacity during initial discharge of the coin half-cells of Examples 1 to 3 and Comparative Examples 2 to 5. FIG. 2 is a graph of Comparative Example 1 and Examples 1 to 3, and FIG. 3 is a graph of Comparative Examples 2 to 5. Referring to FIG. 2 with FIG. 3, Examples 1 to 3 of FIG. 2, compared with Comparative Example 1 of FIG. 2 and Comparative Example 2 to 5 of FIG. 3, exhibit higher capacity at the same voltage, which shows that a larger amount of lithium ions moves at the same voltage in the Examples, that is, lithium ions may more smoothly move (e.g., with a larger flux). As shown in Comparative Examples 2 to 5 of FIG. 3, the boron compound coated only on the surface of the positive active materials acts as resistance and thus suppresses the mobility of the lithium ions.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this present disclosure has been described in connection with what is presently considered to be practical example embodiments, it is to be understood that the present disclosure is not limited to the disclosed embodiments. In contrast, it is intended to cover various modifications and equivalent arrangements included within the spirit and scope of the appended claims and equivalents thereof.

| Description of Some of the Symbols | |
|---|---|
| 100: rechargeable lithium battery | 112: negative electrode |
| 113: separator | 114: positive electrode |
| 120: battery case | 140: sealing member |

What is claimed is:

1. A positive active material for a rechargeable lithium battery, the positive active material comprising:
   a lithium nickel-based metal composite oxide;
   a secondary particle, in which a plurality of primary particles are aggregated;
   a first boron coating portion on an outer surface of the secondary particle; and
   a second boron coating portion on surfaces of the primary particles inside the secondary particle,
   wherein a weight of the first boron coating portion is greater than a weight of the second boron coating portion, and
   wherein a content of the second boron coating portion is about 10 ppm to about 500 ppm based on the positive active material.

2. The positive active material of claim 1, wherein the first boron coating portion and the second boron coating portion each comprise boron oxide, lithium boron oxide, or a combination thereof.

3. The positive active material of claim 1, wherein the first boron coating portion is comprised in an amount of about 70 wt. % to about 98 wt. % and the second boron coating portion is comprised in an amount of about 2 wt. % to about 30 wt. %, each based on a total amount of the first boron coating portion and the second boron coating portion.

4. The positive active material of claim 1, wherein the first boron coating portion is comprised in an amount of about 80 wt. % to about 95 wt. % and the second boron coating portion is comprised in an amount of about 5 wt. % to about 20 wt. %, each based on a total amount of the first boron coating portion and the second boron coating portion.

5. The positive active material of claim 1, wherein a content of the first boron coating portion is about 200 ppm to about 5000 ppm based on the positive active material.

6. The positive active material of claim 1, wherein a total amount of the first boron coating portion and the second boron coating portion is about 0.1 mol % to about 5 mol % based on 100 mol % of the positive active material.

7. The positive active material of claim 6, wherein a total amount of the first boron coating portion and the second boron coating portion is about 0.1 mol % to about 1.3 mol % based on 100 mol % of the positive active material.

8. The positive active material of claim 1, wherein in the lithium nickel-based metal composite oxide, a content of nickel is greater than or equal to about 60 mol % based on 100 mol % of the lithium nickel-based metal composite oxide.

9. The positive active material of claim 1, wherein the lithium nickel-based metal composite oxide is represented by Chemical Formula 1:

$$Li_{a1}Ni_{x1}M^1_{y1}M^2_{1-x1-y1}O_2, \text{ and} \qquad \text{Chemical Formula 1}$$

wherein, in Chemical Formula 1, 0.9≤a1≤1.8, 0.6≤x1≤1, 0≤y1≤0.4, and $M^1$ and $M^2$ are each independently selected from Al, B, Ba, Ca, Ce, Co, Cr, Cu, F, Fe, Mg, Mn, Mo, Nb, P, S, Si, Sr, Ti, V, W, Zr, and combinations thereof.

10. The positive active material of claim 9, wherein $M^1$ is Co and $M^2$ is Al.

11. The positive active material of claim 1, wherein the lithium nickel-based metal composite oxide is represented by Chemical Formula 2 or Chemical Formula 3:

$$Li_{a2}Ni_{x2}CO_{y2}Al_{z2}M^3_{1-x2-y2-z2}O_2, \qquad \text{Chemical Formula 2}$$

wherein, in Chemical Formula 2, 0.9≤a2≤1.8, 0.6≤x2<1, 0<y2<0.4, 0<z2<0.4, and $M^3$ is selected from B, Ba, Ca, Ce, Co, Cr, Cu, F, Fe, Mg, Mn, Mo, Nb, P, S, Si, Sr, Ti, V, W, Zr, and combinations thereof, $$Li_{a3}Ni_{x3}CO_{y3}M^4_{1-x3-y3}O_2, \text{ and} \qquad \text{Chemical Formula 3}$$

wherein, in Chemical Formula 3, 0.9≤a3≤1.8, 0.6≤x3<1, 0<y3≤0.4, and $M^4$ is selected from B, Ba, Ca, Ce, Co, Cr, Cu, F, Fe, Mg, Mn, Mo, Nb, P, S, Si, Sr, Ti, V, W, Zr, and a combination thereof.

12. The positive active material of claim 1, wherein the lithium nickel-based metal composite oxide is represented by Chemical Formula 1:

$$Li_{a1}Ni_{x1}M^1_{y1}M^2_{1-x1-y1}O_2, \text{ and} \qquad \text{Chemical Formula 1}$$

wherein, in Chemical Formula 1, 0.9≤a1≤1.8, 0.92≤x1<1, 0≤y1≤0.04, $M^1$ is selected from Al, B, Ba, Ca, Ce, Co, Cr, Cu, F, Fe, Mg, Mn, Mo, Nb, P, S, Si, Sr, Ti, V, W, Zr, and combinations thereof, and $M^2$ is selected from Al, B, Ba, Ca, Ce, Cr, Cu, F, Fe, Mg, Mn, Mo, Nb, P, S, Si, Sr, Ti, V, W, Zr, and combinations thereof.

13. The positive active material of claim 12, wherein $M^1$ is Co and $M^2$ is Al.

14. The positive active material of claim 1, wherein a weight ratio of the first boron coating portion to the second boron coating portion is about 70:30 to about 98:2.

15. A rechargeable lithium battery, comprising:
a positive electrode comprising the positive active material of claim 1,
a negative electrode, and
an electrolyte.

16. A method of preparing the positive active material of claim 1, the method comprising:
mixing a nickel-based metal composite hydroxide, a lithium raw material and a boron raw material to obtain a mixture, and
heat-treating the mixture at a temperature of about 690° C. to about 725° C.

17. The method of claim 16, wherein a content of the boron raw material is about 0.1 mol % to about 5 mol % based on 100 mol % of the nickel-based metal composite hydroxide.

18. The method of claim 16, wherein the heat-treating of the mixture is performed for about 5 hours to about 15 hours.

* * * * *